United States Patent  [11] 3,633,812

[72] Inventor John R. Haynes
 2630 East 15th Pl., Tulsa, Okla. 74104
[21] Appl. No. 33,602
[22] Filed May 1, 1970
[45] Patented Jan. 11, 1972

[54] WELDING TORCH OSCILLATOR
 2 Claims, 5 Drawing Figs.
[52] U.S. Cl. .................................................. 228/27, 228/28
[51] Int. Cl. .................................................. B23k 1/00, B23k 5/00
[50] Field of Search .......................................... 228/26, 27, 28; 248/295, 320, 321; 74/30, 34

[56] References Cited
UNITED STATES PATENTS
1,613,326  1/1927  Krebs ............................ 228/27 X
2,726,618  12/1955  Tschudi ........................ 228/27

Primary Examiner—John F. Campbell
Assistant Examiner—R. J. Craig
Attorney—Head & Johnson ABSTRACT: A power driven welding torch oscillator includes a hand operable clutch for controlling the oscillatory movement of a welding torch.

INVENTOR.
JOHN R. HAYNES

INVENTOR.
JOHN R. HAYNES
BY
Head & Johnson
ATTORNEYS

INVENTOR.
JOHN R. HAYNES
BY Head & Johnson
ATTORNEYS

WELDING TORCH OSCILLATOR

BACKGROUND OF THE INVENTION

The oscillation of a welding torch relative to material being welded has and still is in many instances done by hand. In welding relatively thick work it is highly desirable to weld with a series of passes until the weld has filled the space between the material.

In such work oscillating the welding head by hand results in nonuniform welding thickness which weakens the strength of the weld.

It is therefore an object of this invention to present a welding torch oscillator for controlling the oscillation of the welding head during the welding cycle.

SUMMARY OF THE INVENTION

This invention provides a welding torch oscillator which incorporates a hand-operated clutch mechanism whereby the oscillator movement of the welding head can be quickly and easily controlled.

DETAILED DESCRIPTION OF PREFERRED EMBODIMENT

Figure 1:
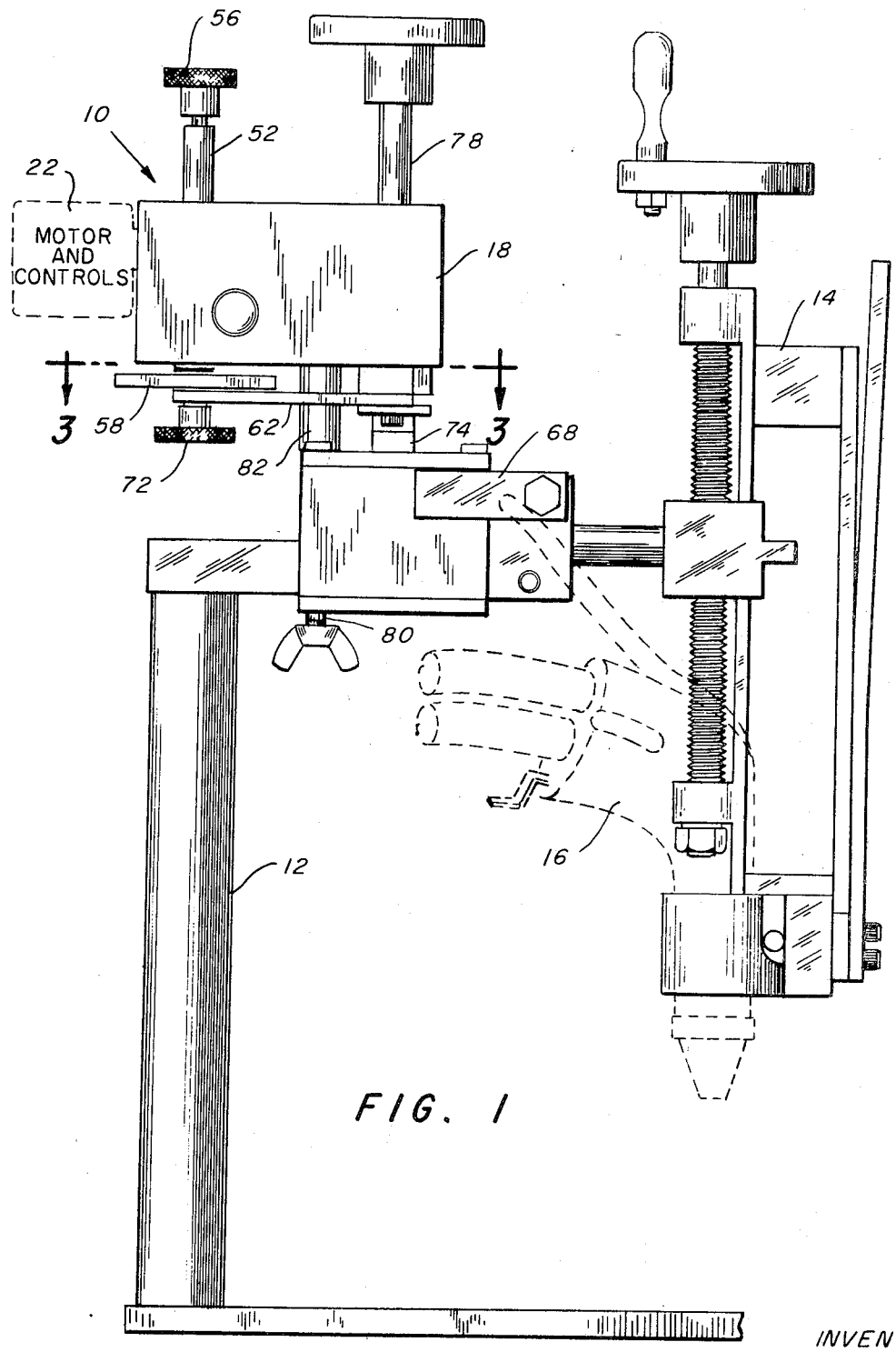
FIG. 1 is a side view of the welding head oscillator of this invention.

Referring now to FIG. 1, the welding torch oscillator of this invention generally denoted as the numeral 10 is supported by a stand 12 and carries a welding torch holder 14 which in turn carries a welding torch 16 shown by dash lines in FIG. 1.

The torch holder 14 may be of a simple stationary type or may include adjustment capabilities such as that disclosed in U.S. Pat. No. 3,494,586, issued to John R. Haynes, entitled Welding Torch Holder.

The welding torch oscillator 10 of this invention is housed in first and second housings 18 and 20 respectively and operably controls the oscillating movement of welding torch 16.

Figure 2:
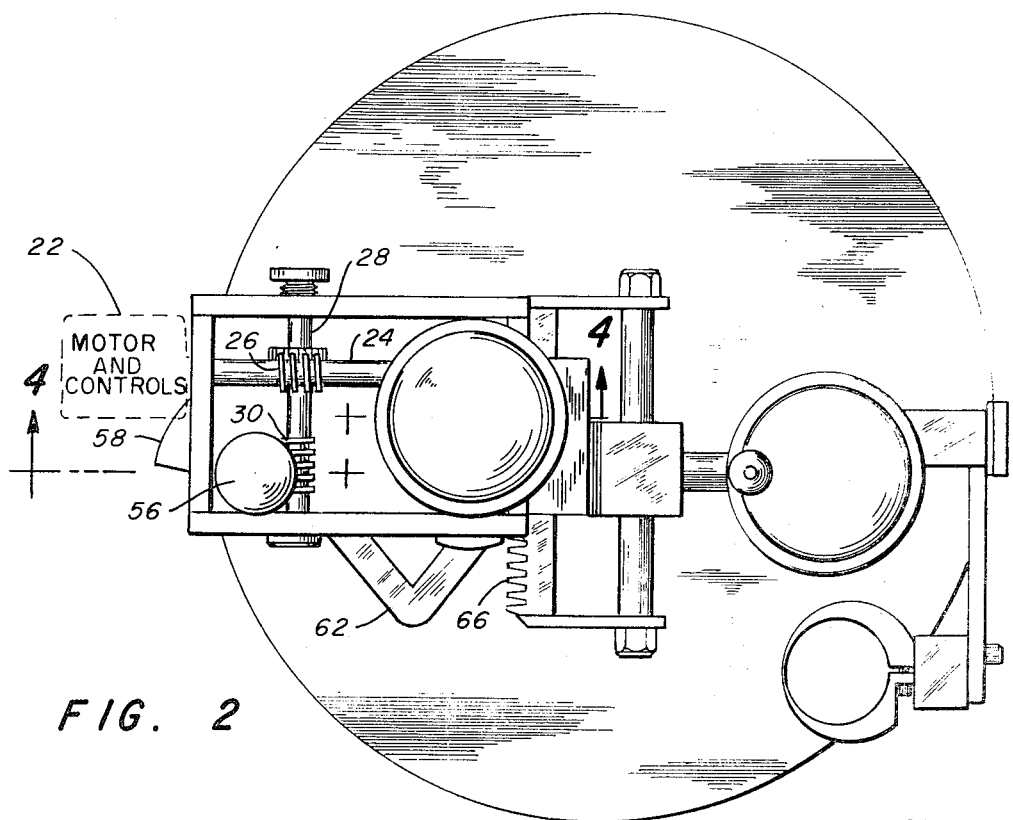
FIG. 2 of the drawings is a top view of the welding head oscillator mechanism.

Turning now to FIG. 2, a motor represented by the dash lines 22 in the drawing is utilized to rotate a drive shaft 24 rotatably secured to housing 18. Shaft 24 drives through a first worm gear mechanism 26, a driven shaft 28 rotatably secured to housing 18 perpendicular to drive shaft 24.

Worm gear 26 acts as a speed reducer to reduce the rotary speed of shaft 28 relative to shaft 24. In instances where the magnitude of the r.p.m. of motor 22 is not prohibitive, the motor 22 can drive shaft 28 and shaft 24 can be eliminated. Motor 22 may be directly coupled to shaft 24 by any suitable means commonly known in the art and the revolutions per minute thereof r.p.m. may be controlled by a motor speed controller such as a rheostat.

Figures 4, 5:
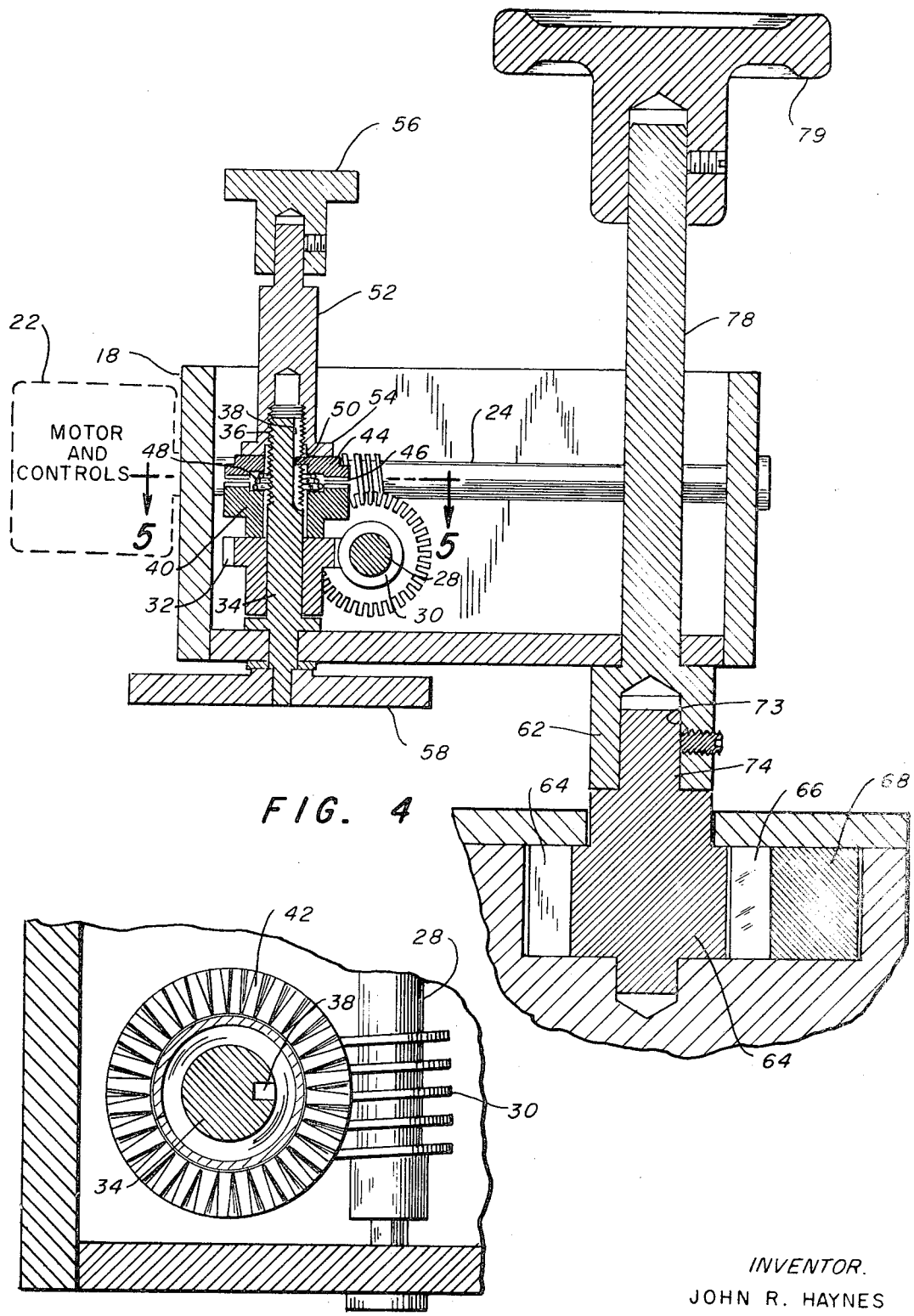
FIG. 4 is a side cross-sectional view of a portion of the welding head mechanism of this invention.
FIG. 5 is a cross-sectional view of the apparatus of this invention taken along the lines 5—5 of FIG. 4.

Turning now to the cross-sectional view of FIG. 4, affixed to driven shaft 28 for common rotation therewith is a worm 30 which meshes with a worm wheel 32 sleeved over a clutching shaft 34. Clutching shaft 34 is rotatably secured to the bottom of housing 18, is mutually perpendicular to the shafts 24 and 28 and projects upwardly beyond worm wheel 32. Male threads 36 and a longitudinal keyway 38 progress downwardly from the upper end of shaft 34.

Sleeved over clutching shaft 34 and permanently secured to the upper end of worm wheel 32 is a lower clutching plate 40 having on the upper surface thereof flat horizontal radial serrated teeth 42 as can be seen in the partial cross-sectional view of FIG. 5.

The inner diameter of both worm wheel 32 and lower clutching plate 40 are slightly larger than the outer diameter of clutching shaft 34 in order to permit rotary movement thereof relative to the clutching shaft. Although clutching plate 40 and worm wheel 32 have been described as being two distinct parts permanently secured together such as by silver solder obviously the two parts just as easily can be manufactured as a single unit.

Received over clutching shaft 34 upwardly of the lower clutching plate 40 is an upper clutching plate 44 which has cut in the lower surface thereof horizontal radial serrated teeth 46 which are capable of meshing with the radial teeth 42 on lower clutching plate 40. A helical spring 48 preferably tapered is interposed between the two clutching plates 40 and 44 and normally biases the upper clutching plate away from the lower clutching plate. A tongue 50 on upper clutching plate 44 projects into keyway 36.

Upper clutching plate 44 is engaged with the lower clutching plate 40 by means of a clutching engaging member 52 which includes at the lower end thereof a horizontal annular flange 54 bearing against the upper surface of upper clutching plate 44 and also includes an internal borehole which contains female threads engaging the male threads 36 of clutching shaft 34. Rotation of the clutch engaging member 50 in one direction drives upper clutching plate 44 downwardly to interlock the horizontal serrated teeth of the upper and lower clutching plates.

Both clutching plates are recessed inwardly of the serrated teeth thereon to provide a receptacle for receiving spring 48 when the clutching plates are engaged. When a tapered spring is utilized the height of the recepticle need only be equal to the diameter of the convolution of the spring since the convolutions become disposed within each other when the spring is depressed. A knurled knob 56 facilitates the rotary movement of the clutch engaging member 52.

With the serrated teeth of the upper and lower clutching plates engaged, rotation of the drive shafts 24 and 28 will effect rotation of clutching shaft 34 due to the imposition of tongue 50 in keyway 38. The rotation of the clutching shaft 34 can be easily controlled by the clockwise or counterclockwise twist of clutch engaging member 52 which operably controls the engagement of this engagement of the upper and lower clutching plates.

Figure 3:
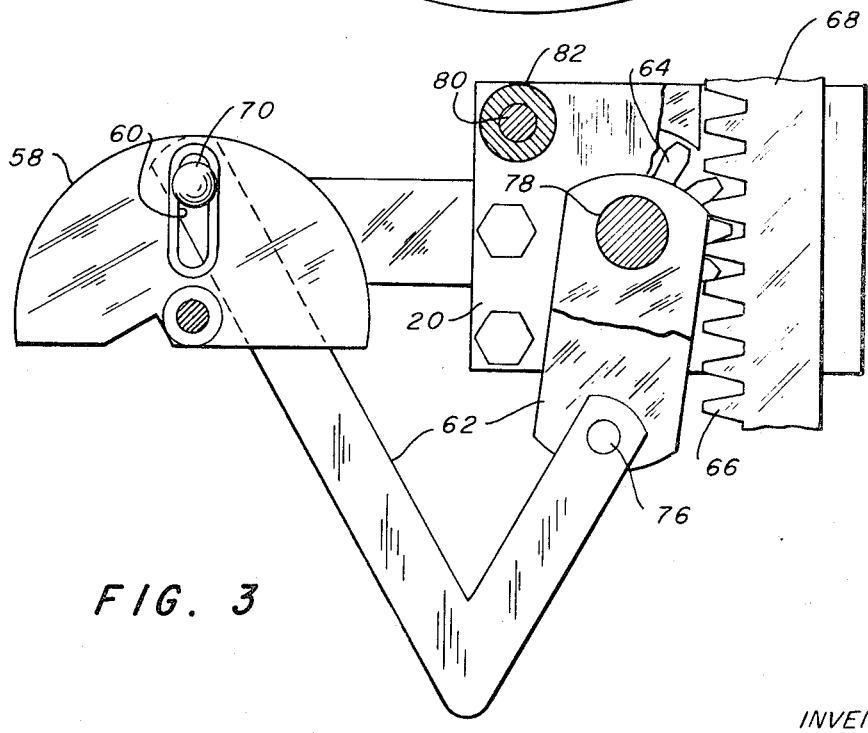
FIG. 3 is a cross-sectional view of the welding head oscillator of this invention taken along line 3—3 of FIG. 1.

Looking now at the lower end of the clutching shaft 34 permanently secured thereto for common rotation therewith is a cam-acting member 58 which includes a transversely elongated slot 60 as can be seen in FIG. 3. Interconnected to cam-acting members through a linkage member 62 is a spur gear 64 which is rotatably disposed in second housing 20 and which meshes with the parallel teeth 66 of a welding torch carriage 68. Welding torch carriage 68 receives and carries welding torch holder 14.

Looking more particularly now to linkage member 62 as is shown in FIGS. 3 and 4, such is connected at one end to cam-acting member 58 by means of a threaded pin 70. A threaded knob 72, shown in FIG. 1, received on the lower end of threaded pin 70 controls the relative position of the linkage member in slots 60.

The opposite end of linkage member 62 includes an open ended slot 73 which encompasses an upstanding shank 74 on spur gear 64. The purpose of the engagement of shank 74 is open ended slot 73 is to transfer movement of linkage member 62 to spur gear 64. Consequently shank 74 can be of any cross-sectional configuration as long as open-ended slot 73 has a similar cross section. Obviously if the cross-sectional configuration is circular a set screw must also be used.

Linkage member 62 is pivotal at 76 so that the linkage member converts the rotary movement of cam-acting member 58 to oscillate clockwise counterclockwise movement of spur gear 64. The oscillating clockwise counterclockwise movement of spur gear 64 in turn effects oscillatory to and fro longitudinal movement of welding torch carriage 68.

The longitudinal distance that the welding torch carriage 68 travels during oscillation is operably adjusted by changing the relative position of threaded pin 70 within elongated slot 60 of the cam-acting member.

Manual oscillation of spur gear 64 is accomplished by the use of an arbor 78 extending upwardly from and secured to linkage member 62 in vertical alignment with spur gear 64. Arbor 78 rotatably progresses through housing 18 and has hand wheel 79 received on the upper end thereof as is shown in FIG. 4.

In situations wherein there are a multitude of stands 12 available, it is convenient to permanently secure a second housing 20 along with the components associated therewith to each of the welding stands 12 and to utilize a single first housing 18 and associated components to rotate the carriage 68 on all of the second housings. Open ended slot 73 and shank 74 permit easy removal and connection of the two housings. Attachment of the first housing to the second housing is obtained by a single bolt 80 shown in FIG. 1 of the housing which extends upwardly through the second housing to become threadedly engaged in the bottom of first housing 18. A sleeve member 82 received over bolt 78 and disposed between the first and second housing maintains proper spacing between the two housings. The lower end of bolt 78 may contain an enlarged wing portion to facilitate the rotation thereof.

During the detailed description of the preferred embodiments specific language has been used for the sake of clarity, however, it is to be understood that such words are not words of limitation and include all equivalents which operate in a similar manner and accomplish a similar purpose.

What is claimed:

1. A welding torch oscillator comprising:
   a housing;
   a driving means;
   a drive shaft rotatably secured to said housing and coupled to said driving means;
   a driven shaft rotatably secured to said housing normal to said first shaft;
   a first worm wheel mechanism coupling said driven shaft to said drive shaft;
   a second worm wheel mechanism including a worm coaxially secured to said driven shaft for common rotation therewith and a worm wheel having an axial central aperture perpendicular the axis of said driven shaft;
   a clutching shaft rotatably journaled through said central aperture and extending upwardly beyond said worm wheel, said clutching shaft possessing male threads on and adjacent to the upper end thereof and further possessing a longitudinal keyway progressing downwardly from the upper end thereof;
   a clutching mechanism sleeved over said clutching shaft and comprising:
      a lower clutching plate sleeved over said clutching shaft and affixed to said worm wheel for common rotation therewith; said lower clutching plate having an upper flat surface containing a plurality of radial serrated teeth,
      an upper clutching plate sleeved over said clutching shaft upwardly of said lower clutching plate; said upper clutching plate including a lower flat surface containing a plurality of radial serrated teeth matching said teeth on said lower clutching plate; and further including a tongue portion keyed in said keyway of said clutching shaft,
      a helical spring intermediate said upper and lower clutching plates adapted to normally bias said upper clutching plate away from said lower clutching plate,
      a clutch engaging member having internal female threads engaging said male threads of said clutching shaft and adapted to operably overcome the biasment of said helical spring to force said radial teeth into engagement whereby rotation of said drive and driven shafts by said driving means effects rotary movement of said clutching shaft,
   a cam-acting member secured to the lower end of said clutching shaft for rotation therewith;
   a spur gear;
   a linkage member interconnecting said cam-acting member and said spur gear and adapted to convert rotary movement of said cam-acting member into oscillating clockwise-counterclockwise movement of said spur gear; and
   a welding head carriage member carrying a welding torch and having parallel teeth engaging said spur gear whereby oscillary clockwise-counterclockwise movement of spur gear results in to and fro oscillary movement of said welding torch carried by said carriage member.

2. A welding torch oscillator as in claim 1 wherein said cam-acting member has therein an elongated slot and wherein said linkage member is adjustably engaged in said slot whereby the longitudinal distance that said welding torch carriage travels during oscillation is variable.

* * * * *